(12) United States Patent
Jones

(10) Patent No.: US 6,223,794 B1
(45) Date of Patent: May 1, 2001

(54) WOODWORKING STATION

(76) Inventor: James Jones, 2951 Dunham Rd., Sharpsville, PA (US) 16150

( * ) Notice: Subject to any disclaimer, the term of this patent is extended or adjusted under 35 U.S.C. 154(b) by 0 days.

(21) Appl. No.: 09/498,787

(22) Filed: Feb. 5, 2000

(51) Int. Cl.[7] ........................................... B27C 5/00
(52) U.S. Cl. .................. 144/135.2; 144/48.6; 144/2.1; 144/137; 144/154; 144/363; 144/371; 194/35.1; 194/48.7; 408/110; 408/712
(58) Field of Search ................. 144/2.1, 134.1, 144/135.2, 137, 48.6, 359, 363, 371, 154; 408/56, 67, 90, 110, 111, 135, 712

(56) References Cited

U.S. PATENT DOCUMENTS

| | | | | |
|---|---|---|---|---|
| 2,610,552 | * | 4/1952 | Victory | 409/96 |
| 3,586,079 | * | 6/1971 | Collins, Sr. | 144/35.1 |
| 3,940,970 | * | 3/1976 | Terral et al. | 408/90 |
| 4,084,629 | * | 4/1978 | Kreusler | 144/48.6 |
| 4,454,898 | * | 6/1984 | Pavnica | 144/48.6 |
| 4,541,759 | * | 9/1985 | Miyoshi | 408/712 |
| 4,582,105 | * | 4/1986 | Wolff | 144/48.6 |
| 5,562,135 | * | 10/1996 | Beth et al. | 144/48.7 |
| 5,615,984 | * | 4/1997 | Oberbreckling | 408/56 |
| 5,713,702 | * | 2/1998 | Turner | 408/111 |

* cited by examiner

Primary Examiner—W. Donald Bray
(74) Attorney, Agent, or Firm—Michael I Kroll

(57) ABSTRACT

A woodworking station is provided, in which cutting heads and cutting bits, e.g. routers, small-bodied rotary tools, plunge routers, and others, are either permanently or interchangeably positioned with respect to a tiltable and rotatable cutting table, such that the operator's hands are free to manipulate the wood being worked. The cutting heads can be raised and lowered by hand controls, or by a foot-controlled electric motor. Self-contained blowers are also included, providing for continuous and simultaneous sawdust removal. Directional lighting is also provided which directs light primarily to the cutting table and away from the operator's face.

20 Claims, 20 Drawing Sheets

WOODWORKING STATION

BACKGROUND OF THE INVENTION

1. Field of the Invention

The present invention relates generally to routers, rotary tools, and other cutting tools and accessories used for woodworking, and the manner and environment in which they are utilized.

2. Description of the Prior Art

There are router attachment devices designed for extending the use of a router and other cutting heads. Typical of these is U.S. Pat. No. 5,311,914 issued to Stornetta on May 17, 1994.

Another patent was issued to Johnson on Jan. 24, 1995 as U.S. Pat. No. 5,383,503. Yet another U.S. Pat. No. 5,617,909 was issued to Duginske on Apr. 8, 1997 and still yet another was issued on Apr. 14, 1998 to Sugita as U.S. Pat. No. 5,738,470.

Another patent was issued to Kopras on May 11, 1999 as U.S. Pat. No. 5,90,080.

A router dust hood has a sub base which attaches to the base plate of a router. A dust hood slides over the motor and is coupled to the sub base. The handles of the router are taken off and mounted on to the hood. A top rubber casing slides over the motor and is coupled to the top of the dust hood. A vacuum is coupled to the dust hood for the removal of chips and dust from the work area. The sub base raises the router off the work surface allowing more air volume around the router bit to aid in the quickened removal of dust and chips from the work area into the vacuum. The sub base is circularly designed, with an outer lip, allowing an operator to guide the router on a template.

Apparatus for guiding the movement of a hand held router relative to a workpiece comprises a support forming an upwardly facing base adapted to underlie and support a workpiece to be routed. A plurality of parallel guide posts extend upwardly from the support and carry a rigid frame having an open central portion. The frame is mounted on the guide posts for guided sliding movement toward and away from the base to overlie a workpiece supported on the base. Springs bias the frame away from the base and clamps act to overcome the bias and clamp the frame into engagement with the uppermost surface of a workpiece supported on the base. A router guide template is removably connected in the open central portion of the rigid frame at a location to substantially engage the uppermost surface of a workpiece support on the base when the frame is clamped into engagement therewith.

A woodworking machinery jig and fixture system includes a track which is attached to a separate plywood fence, auxiliary table or other workpiece support of woodworking machinery such as a table saw, a band saw, radial arm saw, miter saw, a drill press or a router table. A flip stop and an optional microadjuster mount to a T-shaped slot in the track. An angle bracket is also provided for making right angle connections of track to track or track to support. A location stop records the position of a track relative to a flip stop or other jig or fixture and a circle jig can be used in the track to cut circles. A miter guide, optionally having a fixed head, has a longitudinally adjustable auxiliary fence and a miter bar with an anti-play feature in which a bearing is adjusted to slide on the side of a table top slot in which the bar is received. A guideway for the miter guide has a concave bottom wall which adjustably flexes to tighten the guideway around a miter guide bar.

In a guide device for cutting a groove of this invention, a rectilinear guide member (10) comprises a pair of guide members (11, 12), where the opening width ($W_1$, $W_2$) of an opening (26) defined between the guide members (11, 12) is set to be the same as the diameter of a rotary bit of a router (22). A dado (2) having a width that is the same as the thickness of a board to be used as a shelf is formed by operating the router (22) with a scrap piece of that board (3a) inserted between the guide members (11, 12) to get an accurately cut dado.

A detachable battery pack is connectable to hand-held power tools, such as spiral cutting tools, in which cuts are made by positioning the axis of the cutting tool motor housing perpendicular to a workpiece surface, and moving a cutting tool bit through the workpiece in a direction perpendicular to the axis of the bit to remove material from the workpiece. The battery pack allows the cutting tool to be utilized without an electric cord and without the need of a power source near-by, thereby increasing maneuverability, safety, and range of use. The battery pack is connected to the motor housing of the power tool by being received by a receptacle. The receptacle is preferably formed to include one or more storage compartments therein, accessible through apertures in the receptacle for storage of additional cutting tool bits. A sliding door on the receptacle may be provided to allow access to the storage compartments, and to close the compartments to secure items stored therein during operation of the cutting tool. The receptacle extends outwardly beyond the motor housing over a handle so that the weight of the battery pack is centered over the handle.

A drill press attachment device is provided by Dremel Tools, and is referred to as the Model #212. It appears to be very small and particularly configured for a small-bodied rotary tool, with a hand crank for lowering and raising the tool on a single shaft over a cutting table.

While these woodworking devices may be suitable for the purposes for which they were designed, they would not be as suitable for the purposes of the present invention, as hereinafter described.

SUMMARY OF THE PRESENT INVENTION

A primary object of the present invention is to provide a woodworking station that will overcome the shortcomings of prior art devices.

Another object of the present invention is to provide a woodworking station that can effectively position and utilize a cutting head, e.g. a router, such that the cutting head is stationary while the wood is moved by the operator.

A further object of the present invention is provide a woodworking station which raises or lowers the cutting head in response to a foot control, thus leaving the operator's hands free for wood handling.

Another object of the present invention is to provide such a woodworking station that includes blower devices that are optimally located and conveniently controlled, such that sawdust is continuously removed from the cutting bit area.

Yet another object of the present invention is to provide a fixed and accurately positioned router that can start a new cut, by lowering the router onto the wood, thus negating the need for pre-drilling a hole, as is the case with a scroll saw.

Yet another object of the present invention is to provide a woodworking station that allows various hand held cutting heads, e.g. routers, small-bodied rotary tools, and others, to be secured and optimally positioned with respect to the cutting table, the hand held tools having large variations in body width.

Still yet another object of the present invention is to provide a woodworking station that includes a lighted cutting table, with such lighting being optimally placed and controlled for maximum coverage of the cutting table, the amount of light shining toward the operator's face being minimized.

Still yet another object of the present invention is to provide a woodworking station in which the cutting head approach to the cutting table is optimized by the cutting table's ability to both tilt and rotate in a horizontal plane.

Additional objects of the present invention will appear as the description proceeds.

The present invention overcomes the shortcomings of the prior art by providing a woodworking station in which cutting heads and cutting bits, e.g. routers, small-bodied rotary tools, plunge routers, and others, are either permanently or interchangeably positioned with respect to a tiltable and rotatable cutting table, such that the operator's hands are free to manipulate the wood being worked. The cutting heads can be raised and lowered by hand controls, or by a foot-controlled electric motor. Self-contained blowers are also included, providing for continuous and simultaneous sawdust removal. Directional lighting is provided which directs light primarily to the cutting table and away from the operator's face.

The foregoing and other objects and advantages will appear from the description to follow. In the description, reference is made to the accompanying drawings, which form a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

DESCRIPTION OF THE REFERENCED NUMERALS

Figure 1:
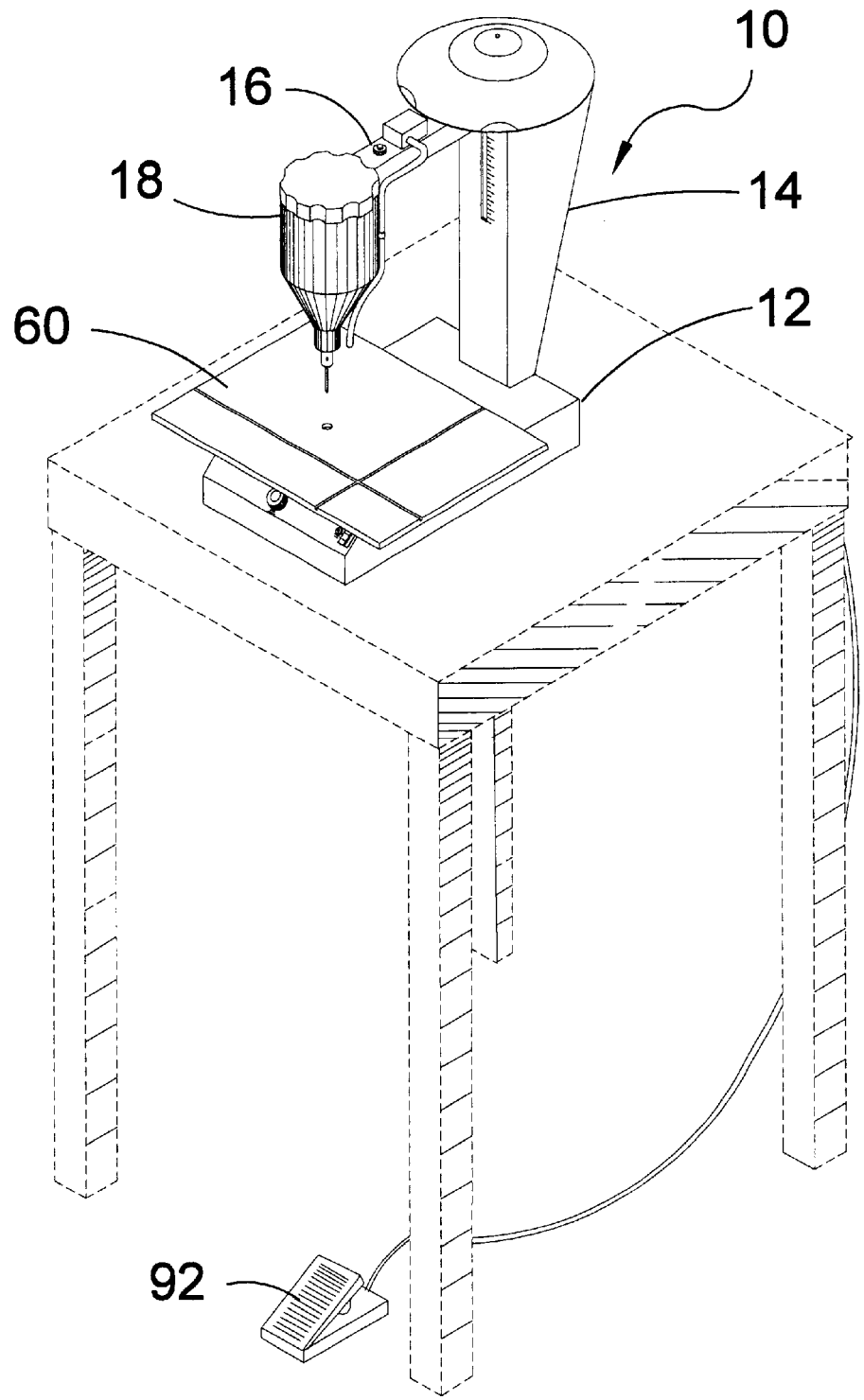
FIG. 1 is an oblique right side view of the woodworking station of the present invention, being supported by a table.

Turning now descriptively to the drawings, in which similar reference characters denote similar elements throughout the several views, the Figures illustrate the woodworking station of the present invention. With regard to the reference numerals used, the following numbering is used throughout the various drawing figures.

10 woodworking station of the present invention
12 base
13 wood workpiece
14 tower
16 extension member
18 permanently affixed cutting head
19 cutting bit
20 router
22 small-bodied rotary tool
30 universal mount
32 support member 34 grasping member
36 grasping member side
38 grasping member side
40 grasping member width adjustment screw
42 grasping member positioning screw
44 setscrew and brace combination
46 setscrew and brace combination
48 router power chord
50 small-bodied rotary tool power chord
52 extension member hole
60 cutting table
61 cutting table hole
62 tilt mechanism
64 tilt mechanism setscrew
66 pedestal
67 cutting hole interchangeable insert
68 cutting hole interchangeable insert
72 pinion gear
74 rack gear
76 spur gear
78 control arm
80 control arm shaft wing
82 control arm shaft
84 stop gear
86 knob
90 electric motor
92 electric motor foot control
100 blower motor
102 blower motor discharge
104 sawdust
110 blower motor
112 hose
120 electric light
122 electric light
124 light beams
130 permanently affixed cutting head power switch
132 permanently affixed cutting head speed control
134 blower power switch
136 blower speed control
138 light switch
140 wiring and wiring harnesses
142 electric junction box
144 power chord

DETAILED DESCRIPTION OF THE PREFERRED EMBODIMENT

Turning now descriptively to the drawings, in which similar reference characters denote similar elements throughout the several views, FIGS. 1 through 20 illustrate the woodworking station of the present invention indicated generally by the numeral 10.

Figure 6:
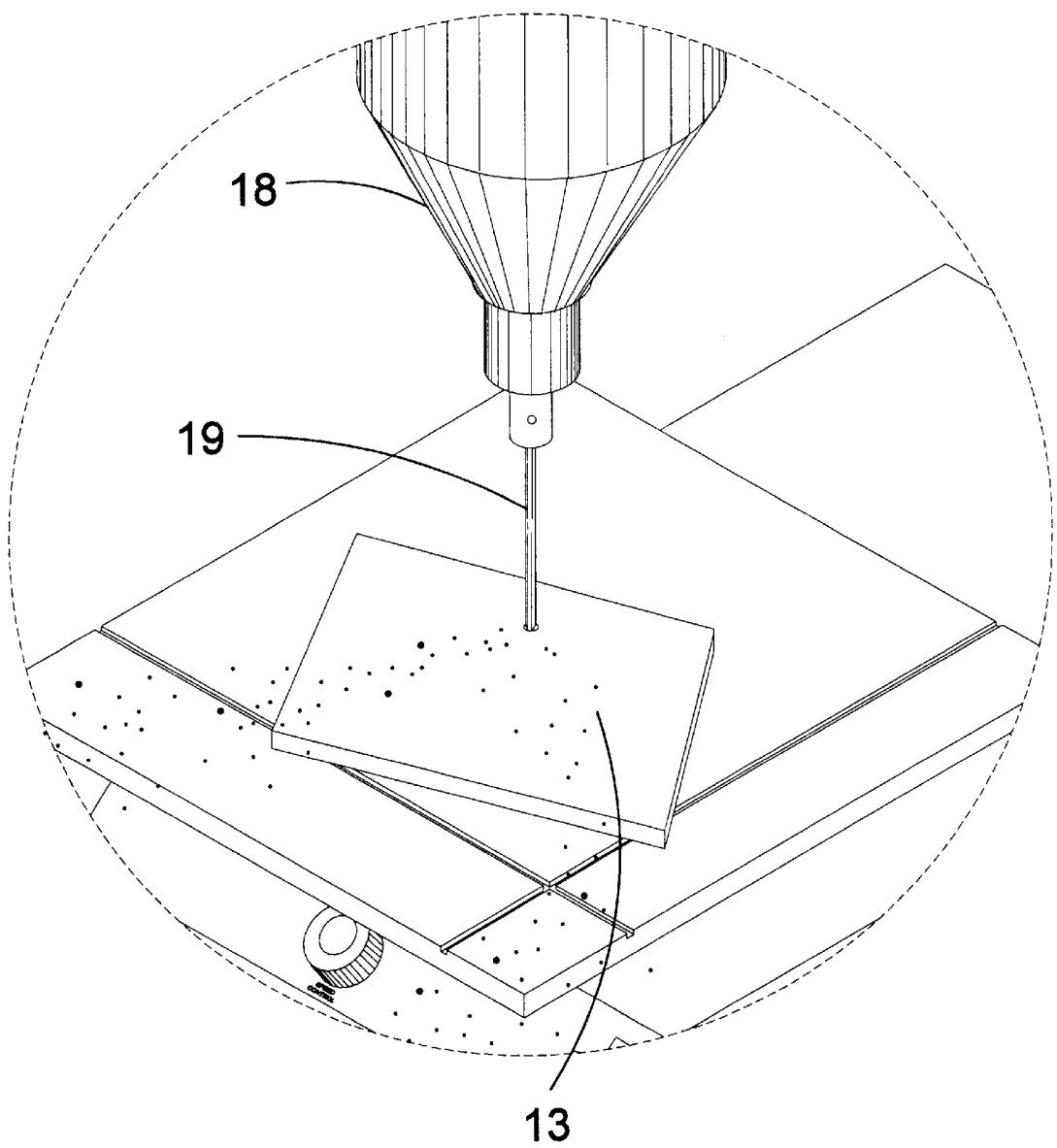
FIG. 6 is an oblique right side view of a wood workpiece being cut by the cutting bit, without a pre-drilled hole.
Figure 7:
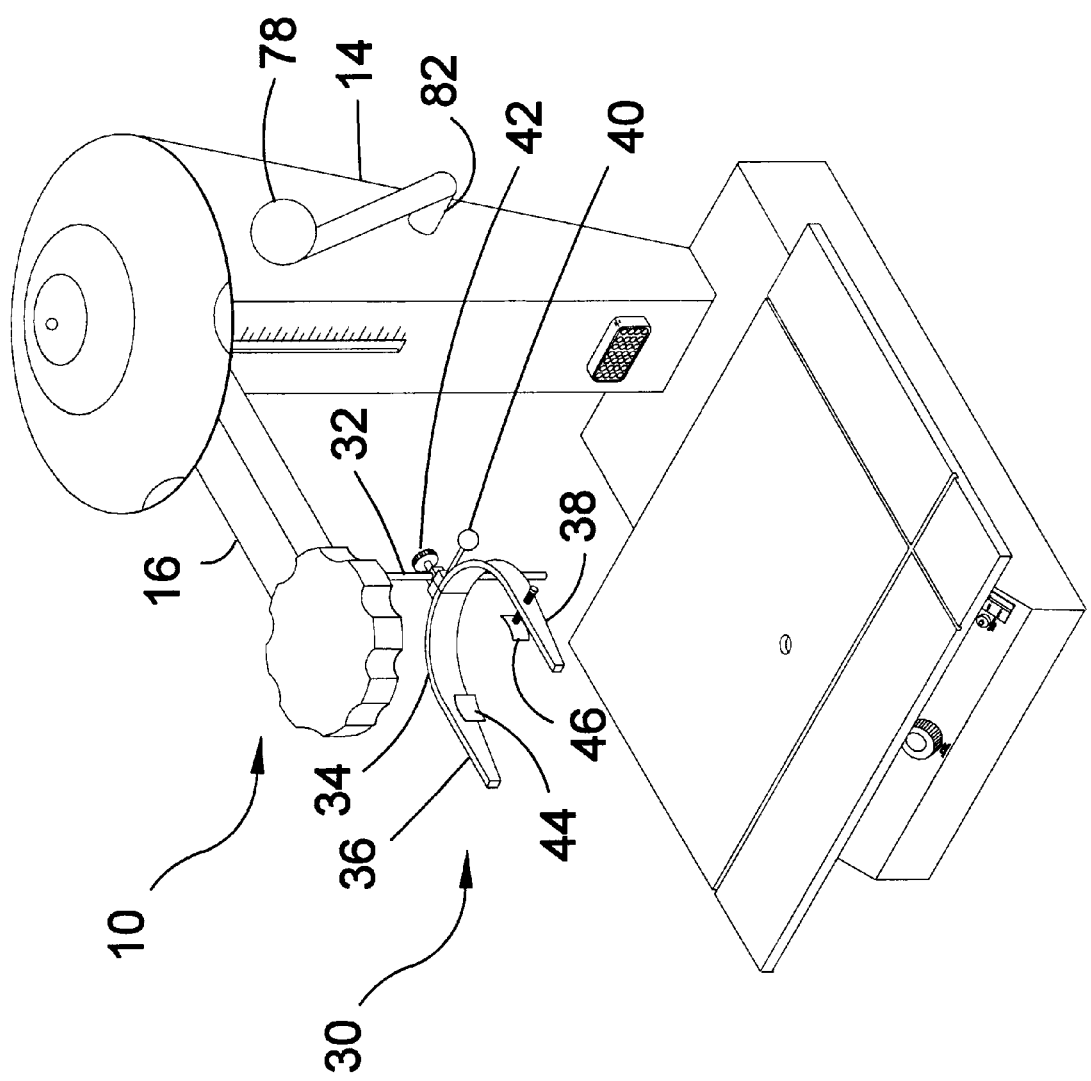
FIG. 7 is an oblique right side view of the woodworking station of the present invention, emphasizing the universal mount and manual control arm.

The woodworking station 10 is shown in FIG. 1, and a representative wood workpiece 11 is shown in FIG. 6. The woodworking station 10 is a device which is optimally configured and equipped for woodworking activities utilizing a cutting head, e.g. a router or small-bodied rotary tools having body portions with diameters as small as ½ inches.

The device 10 has a base 12 for positioning the device 10 on a substantially horizontal surface such as a table, as illustrated in FIG. 1. A tower 14 extends from the base 12 in a primarily vertical direction. An extension member 16 extends from the tower 14. A cutting head 18 is permanently affixed to the extension member 16 in the embodiments shown in FIGS. 1–6, 13–14, the cutting head 18 having a removable cutting bit 19. In an alternate embodiment, a router 20 and a small-bodied rotary tool 22 are removably secured beneath the extension member 16 by the use of the universal mount 30, as shown in FIGS. 8–11,17 and FIG. 12, respectively.

Figure 8:
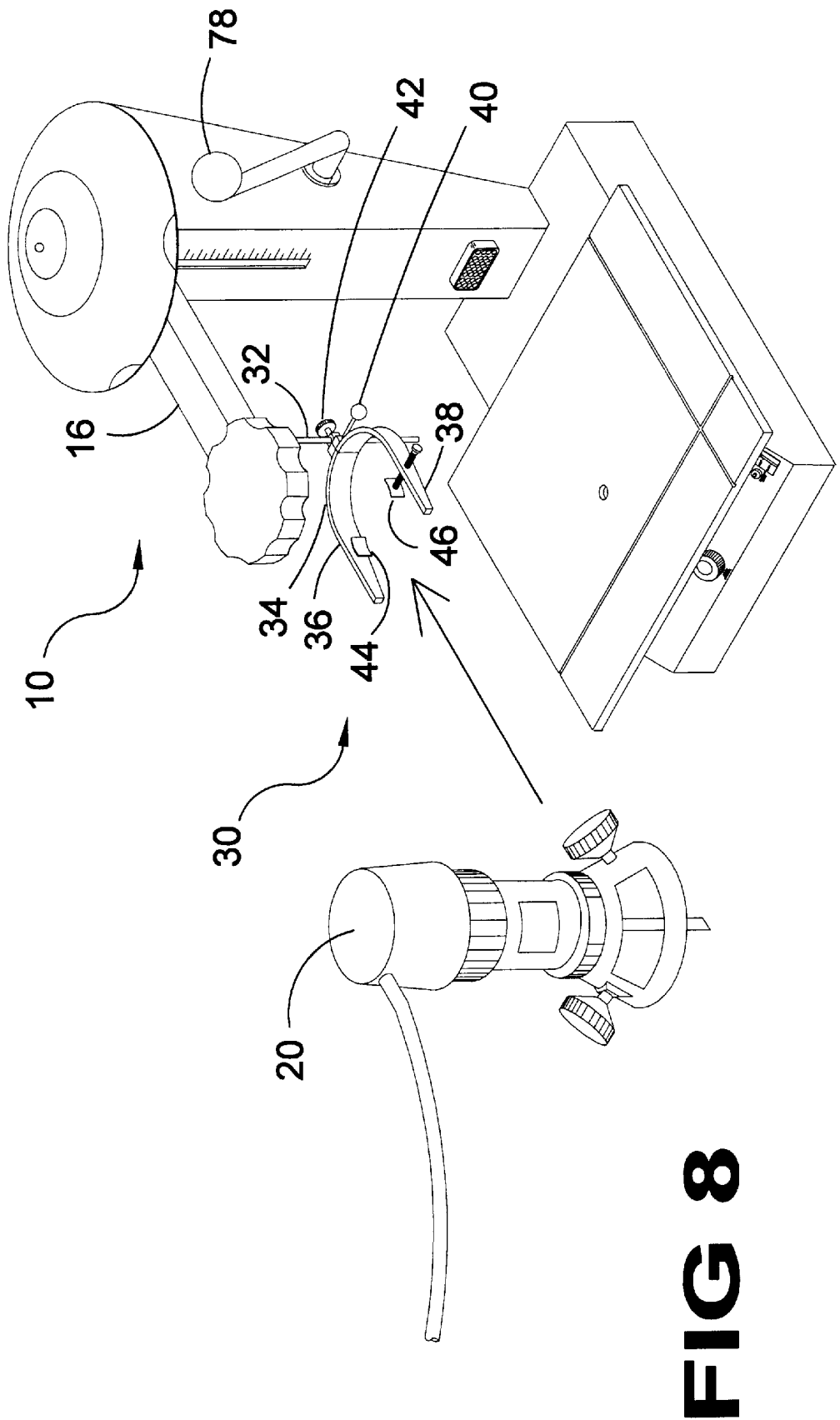
FIG. 8 is an oblique right side view of the woodworking station of the present invention, emphasizing the standard router approach to the universal mount.
Figure 12:
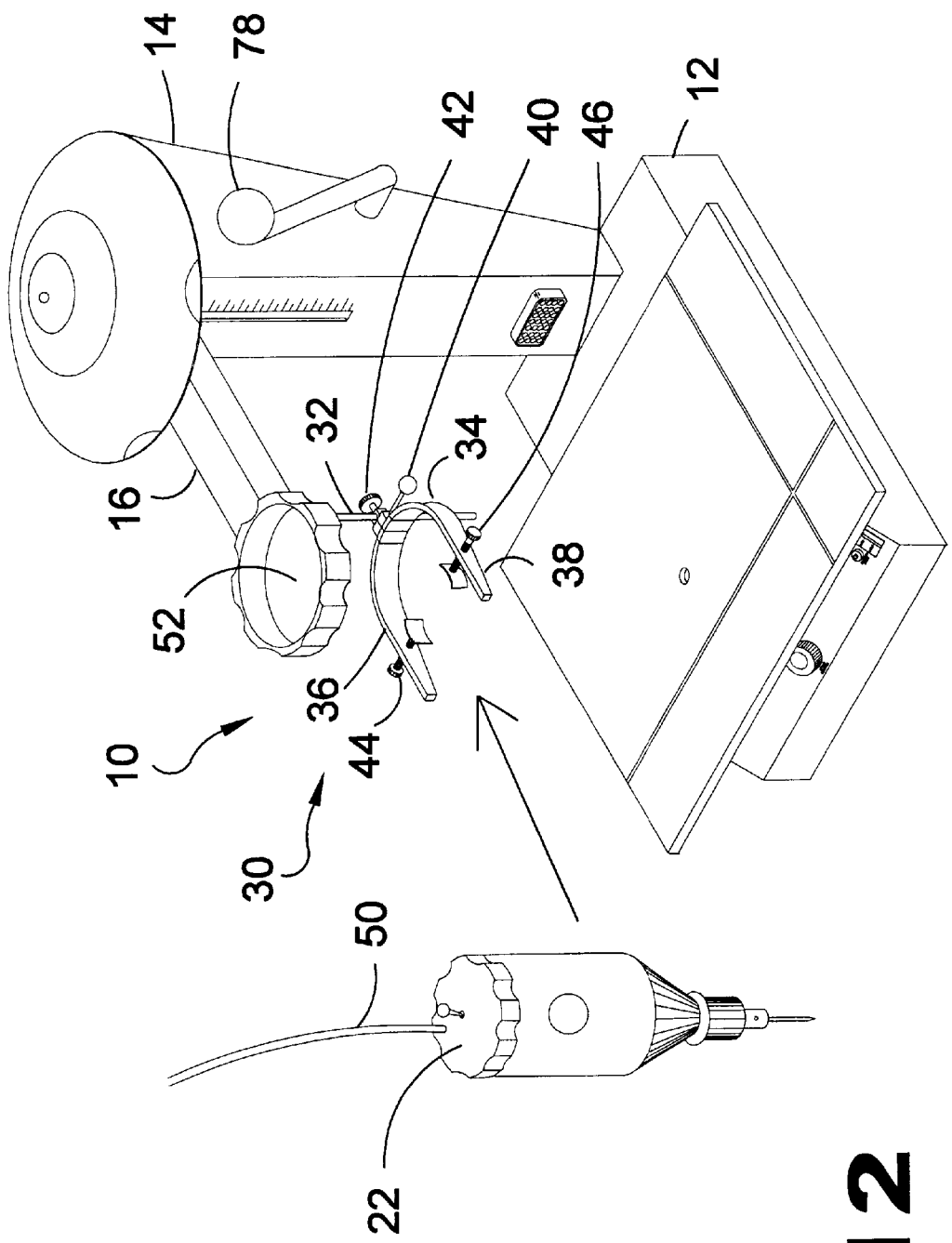
FIG. 12 is an oblique right side view of the woodworking station of the present invention, illustrating the small-bodied rotary tool approach to the universal mount.
Figure 13:
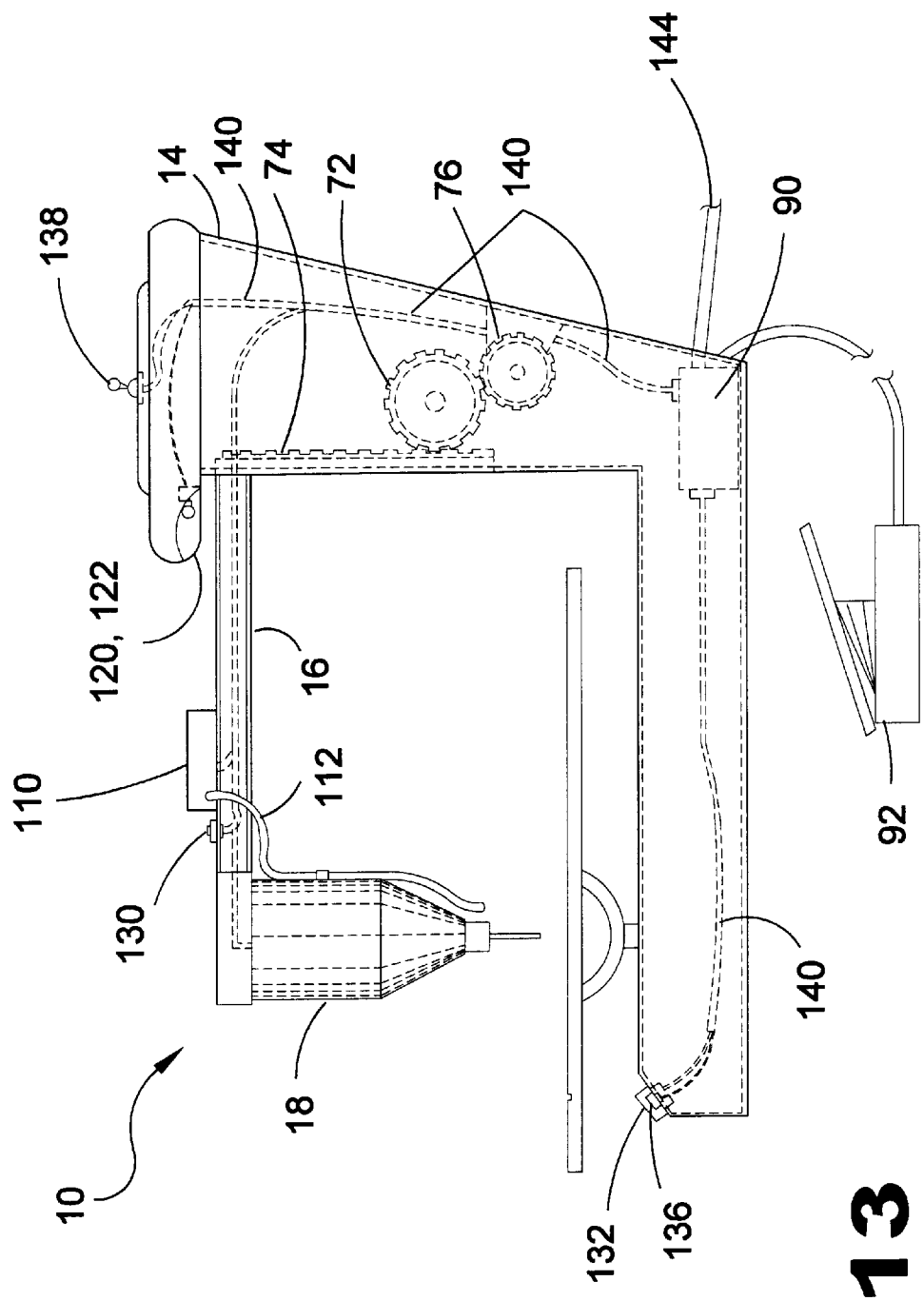
FIG. 13 is a cutaway right side view of the woodworking station of the present invention, illustrating some of the internal components for the embodiment shown, with the cutting head in a raised position.
Figure 14:
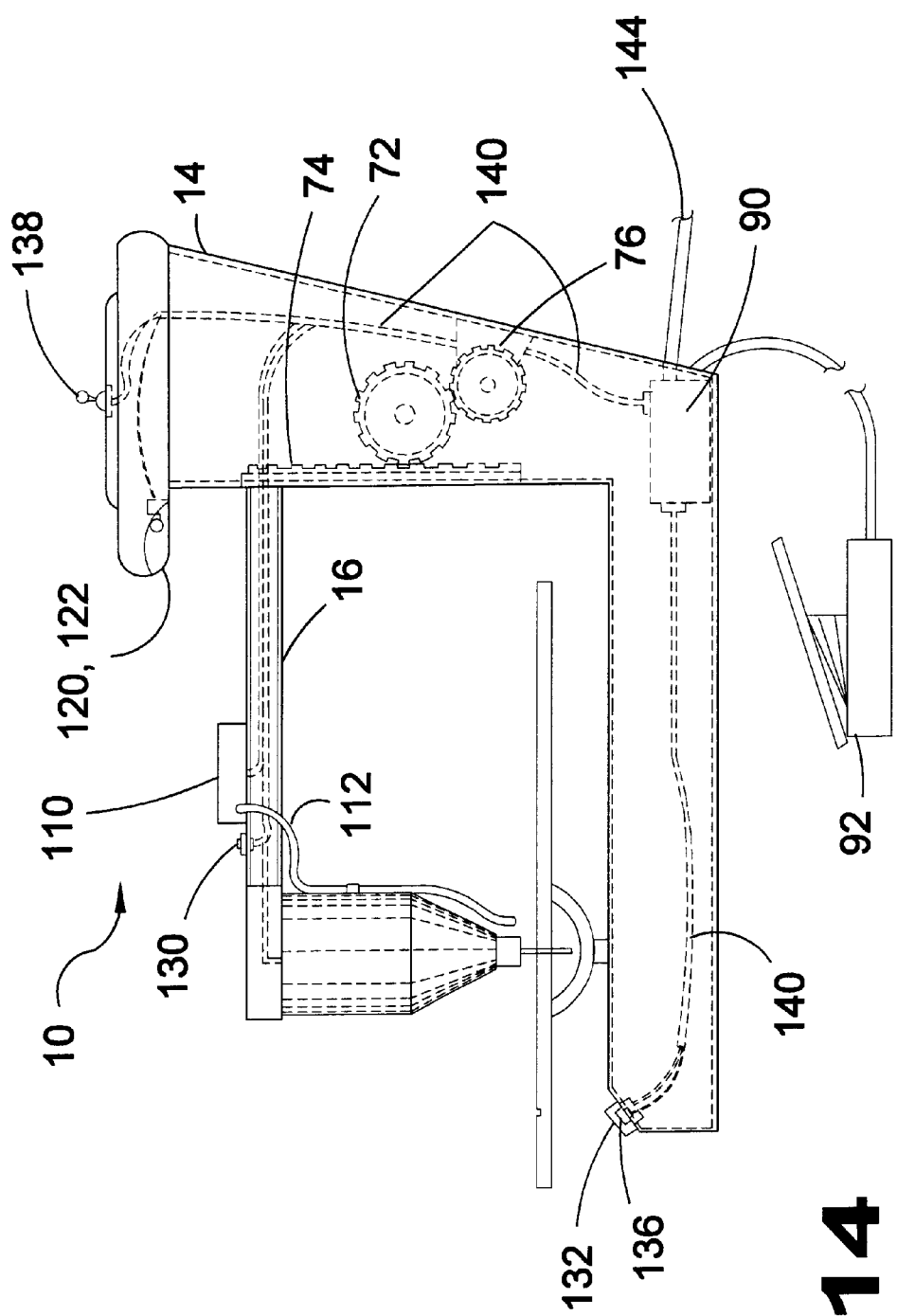
FIG. 14 is a cutaway right side view of the woodworking station of the present invention, illustrating some of the internal components for the embodiment shown, with the cutting head in a lowered position.

The universal mount 30 is attached to a support member 32, which is attached to the extension member 16. As shown in FIGS. 7–8,12,15–16, the support member 32 is rigid and extends in a generally downward direction. At least one grasping member 34 is attached to the support member 32, and is positioned to receive various cutting heads, e.g. the router 20 and the small-bodied rotary tool 22, as shown in FIG. 8 and FIG. 12, respectively. In this embodiment, the grasping member 34 is generally "U" shaped, with sides 36 and 38 being expandable by rotation of the width adjustment screw 40. In other embodiments (not shown), the grasping member sides 36,38 are curved in a "C" shape. To optimize the grasping function of the grasping member 34, a grasping member positioning screw 42 is provided, which allows positioning of the grasping member 34 along the support member 32, which in turn allows the grasping member 34 to encompass the body of the router 20 or small-bodied rotary tool 22 at the optimum location on their respective bodies.

The grasping function is even further optimized by positioning the grasping member 34 on the support member 32 such that the router 20 or small bodied rotary tool 22 abuts the extension member 16. This provides support against lateral movement of the router 20 or small-bodied rotary tool 22. Such lateral movement can be resisted even further by a recess (not shown) in the underside of the extension member 16, the router 20 or small-bodied rotary tool 22 contacting the extension member 16 in such recess.

The grasping function can also be enhanced or independently accomplished by the addition of opposing setscrew and brace combinations 44,46 on the grasping member sides 36,38, as shown in FIGS. 7–10,12,15–17. Rotation of such setscrews and braces 44,46 causes the router 20 or small-bodied rotary tool 22 to be squeezed. By carefully adjusting such setscrew and brace combinations 44,46, an enhanced vertical alignment of the router 20 or small-bodied rotary tool 22 can also be achieved. The curved brace portions of the setscrew and brace combinations 44,46 are preferred, but optional.

The power chords 48,50 for the router 20 and small-bodied rotary tool 22 are shown in FIGS. 8–10,12,17. In the case of the power chord 50 for the small-bodied rotary tool 22, the extension member 16 can be provided with a hole 52 sized to allow passage of such power chord 50 through the extension member 16.

A cutting table 60 is provided which has cutting table hole 61, which allows the passage of the various cutting bits 19. The cutting table 60 is mounted on a tilt mechanism 62. The amount of tilt is adjusted by loosening tilt mechanism setscrew 64, moving the table 60, and re-tightening the setscrew 64. The tilt mechanism 62 is rotatably mounted on a pedestal 66, the pedestal 66 being attached to the base 12. The rotation of the table 60 on the pedestal 66 is in a plane, which is substantially horizontal to the base 12. A table hole 61 is provided.

A rack and pinion gear combination is within the tower 14, the pinion gear 72 being rotatably attached to the tower 14, while the rack gear 74 is slidably positioned for movement along the tower 14 in a substantially vertical direction. The pinion gear 72 is rotated by a spur gear 76, which is attached to the tower 14. A control arm 78 extends into the tower 14 and is attached to the spur gear 76, such that movement of the control arm 78 rotates the spur gear 76, which rotates the pinion gear 72, which, in turn, slides the rack gear 74. The extension member 16 attaches to the rack gear 74 and is thus moved with respect to the tower 14 as the rack gear 74 moves. FIGS. 13–16 show one or more of the pinion gear 72, the rack gear 74, the spur gear 76, and the control arm 78, however, the illustrations of the relative sizes of such components are not necessarily to scale. In particular, the pinion gear 72 and spur gear 76 can be sized, relative to the rack gear 74, such that rotation of the pinion gear 72 by the loaded rack gear 74 is effectively resisted. Such resistance can be assisted by allowing the loaded extension member 16 to slightly push the rack gear 74 into the pinion gear 72.

Figure 9:
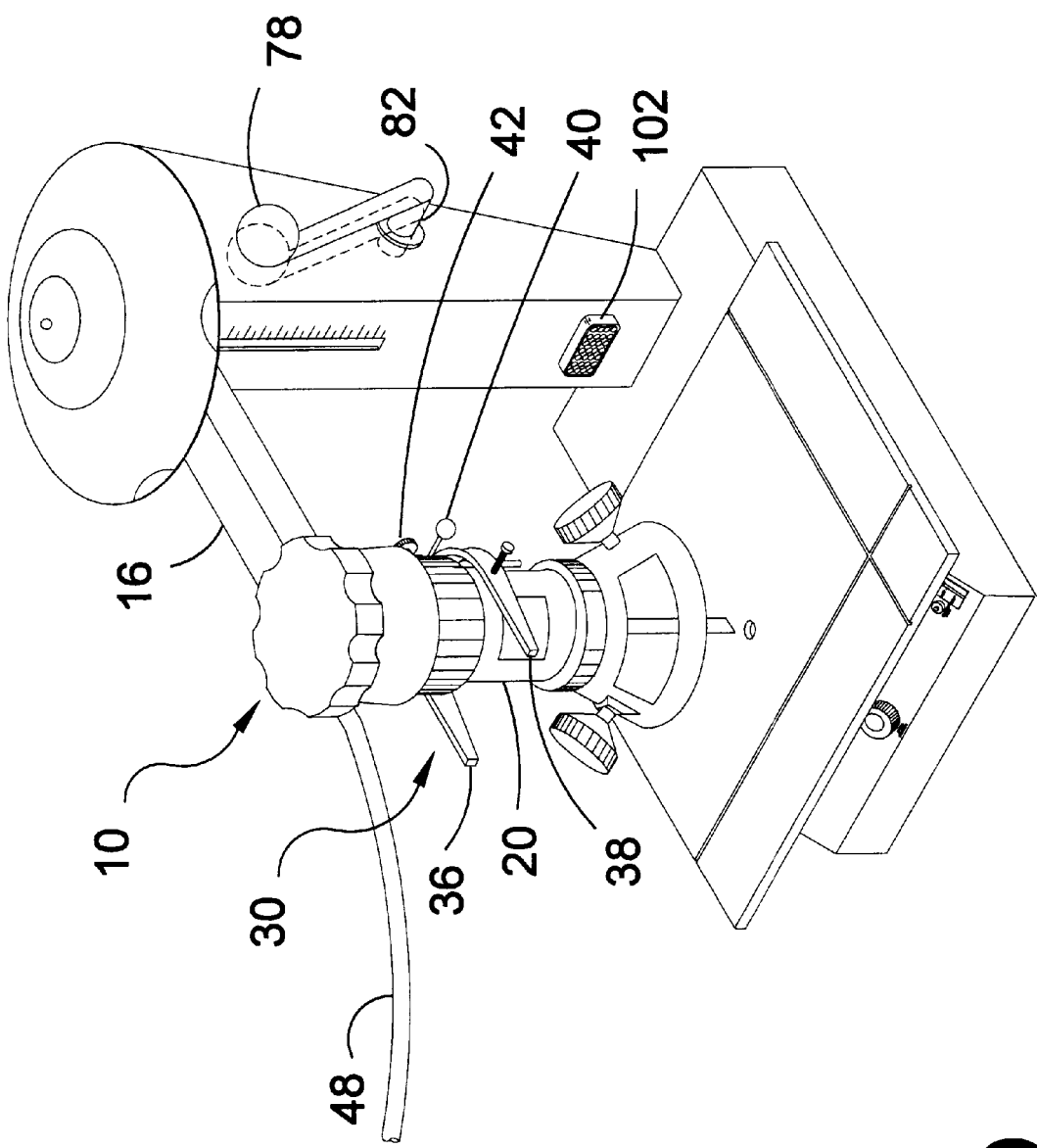
FIG. 9 is an oblique right side view of the woodworking station of the present invention, illustrating the standard router position in the universal mount.
Figure 10:
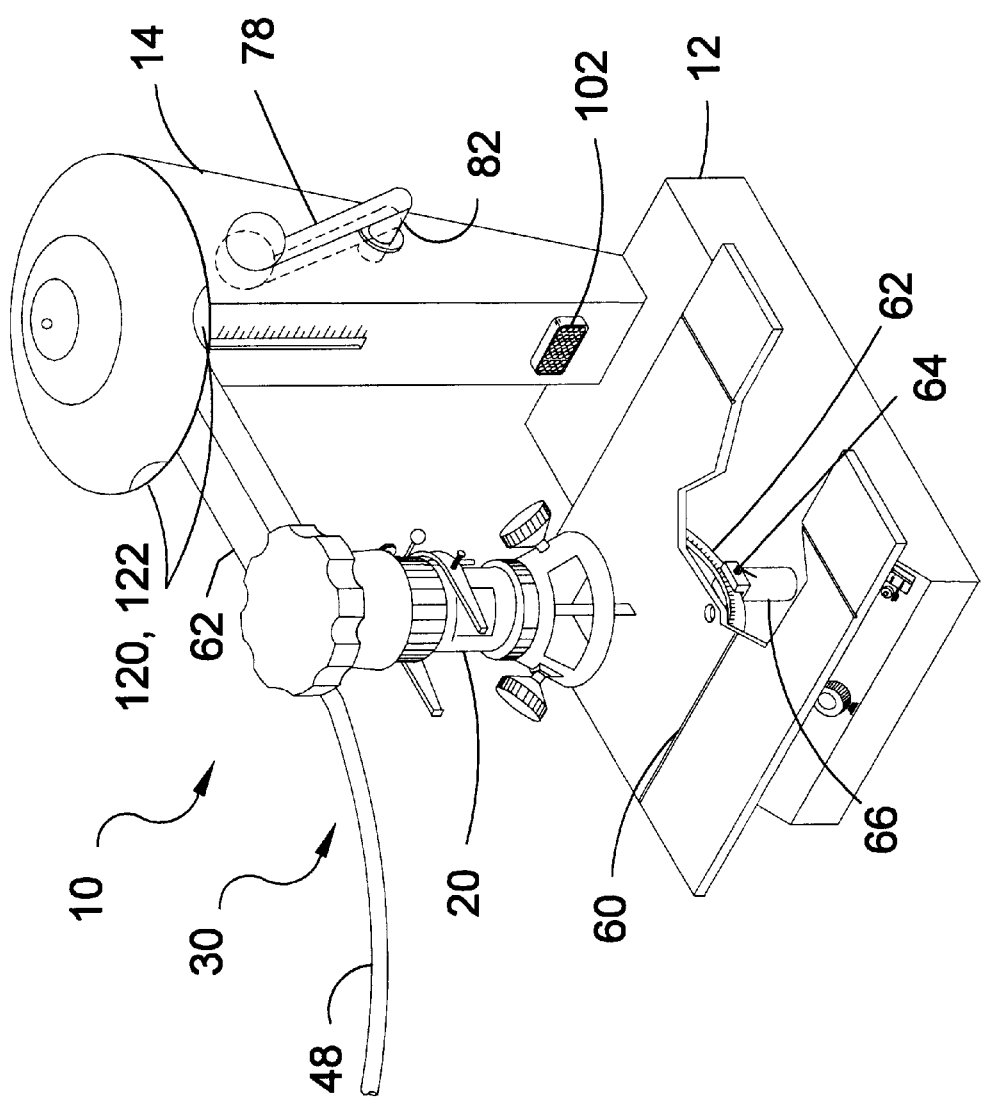
FIG. 10 is an oblique right side view of the woodworking station of the present invention, emphasizing the components of the interchangeable cutting head embodiment, with the standard router in place.
Figure 11:
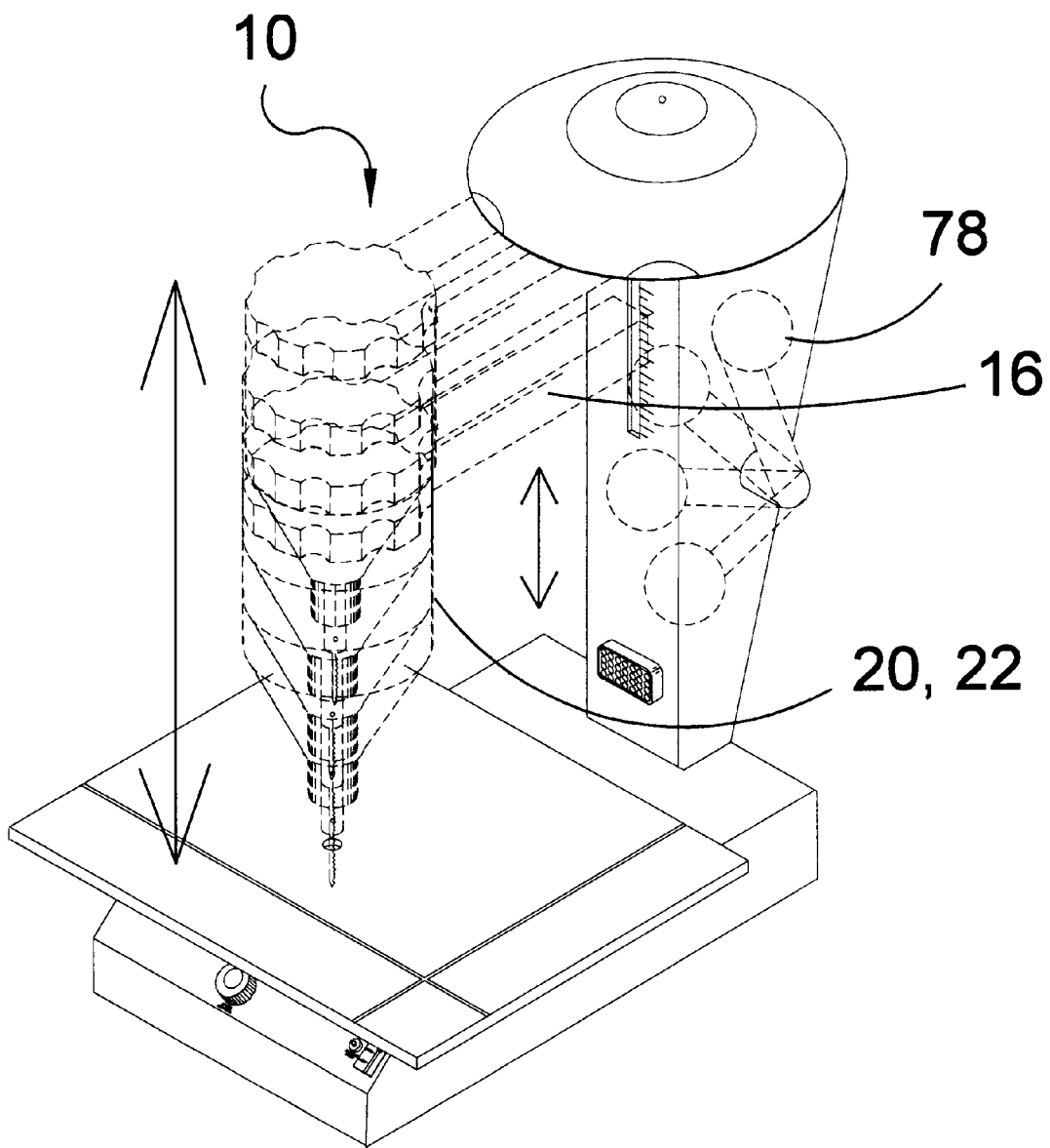
FIG. 11 is an oblique right side view of the woodworking station of the present invention, illustrating the vertical adjustability of the standard router.
Figure 17:
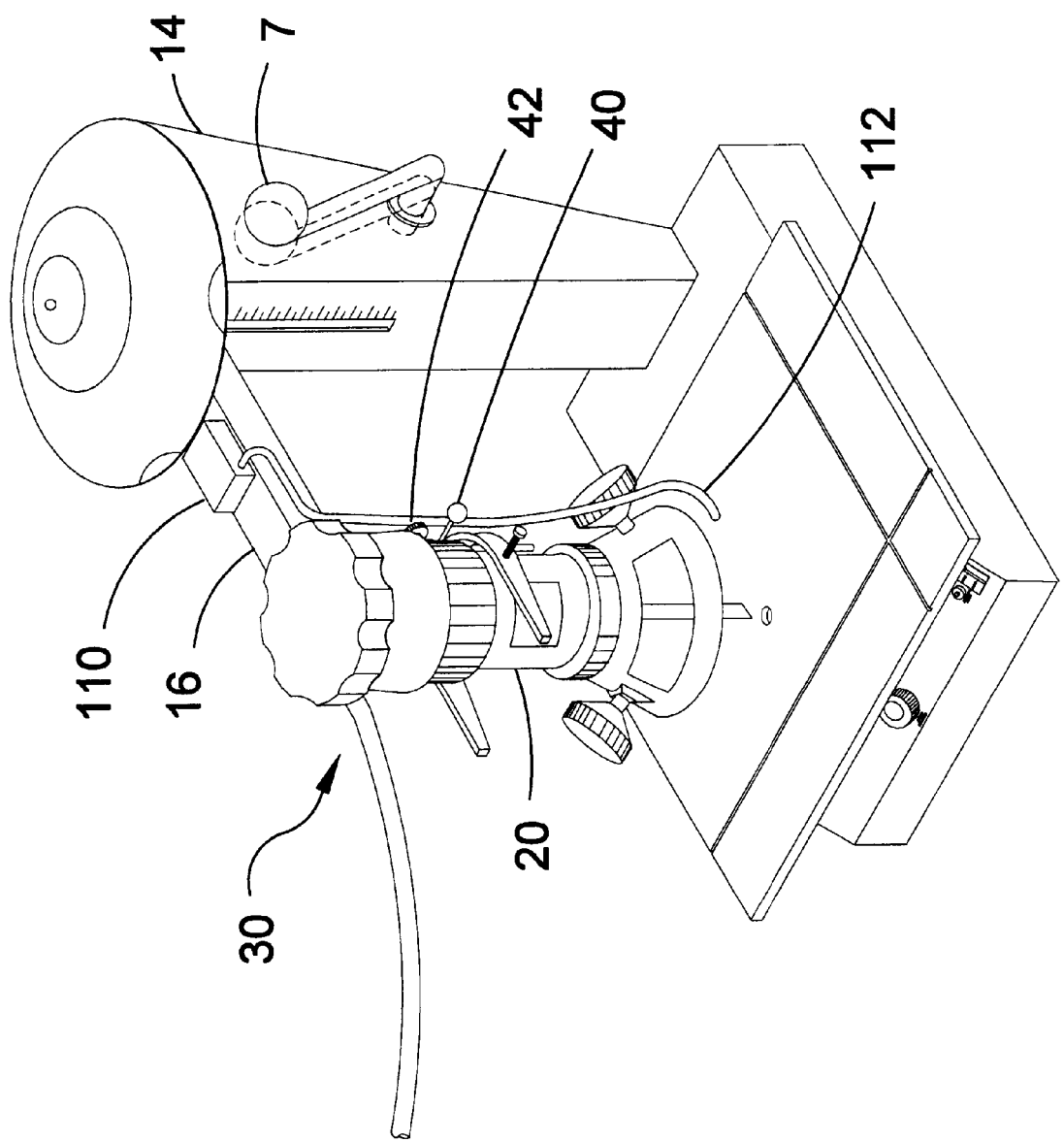
FIG. 17 is an oblique right side view of the woodworking station of the present invention, illustrating the blower hose position with respect to the standard router.
Figure 18:
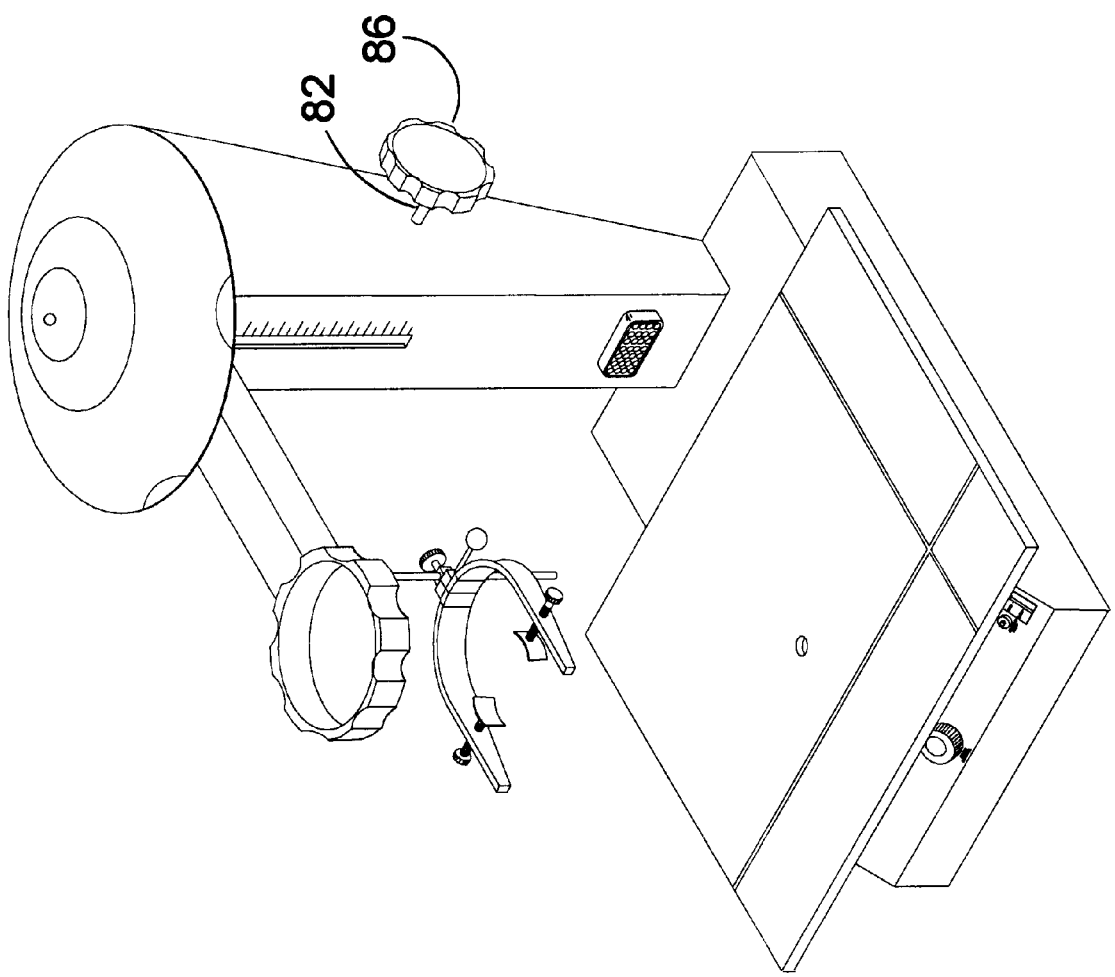
FIG. 18 is an oblique right side view of the woodworking station of the present invention, illustrating the vertical adjustment knob.
Figure 19:
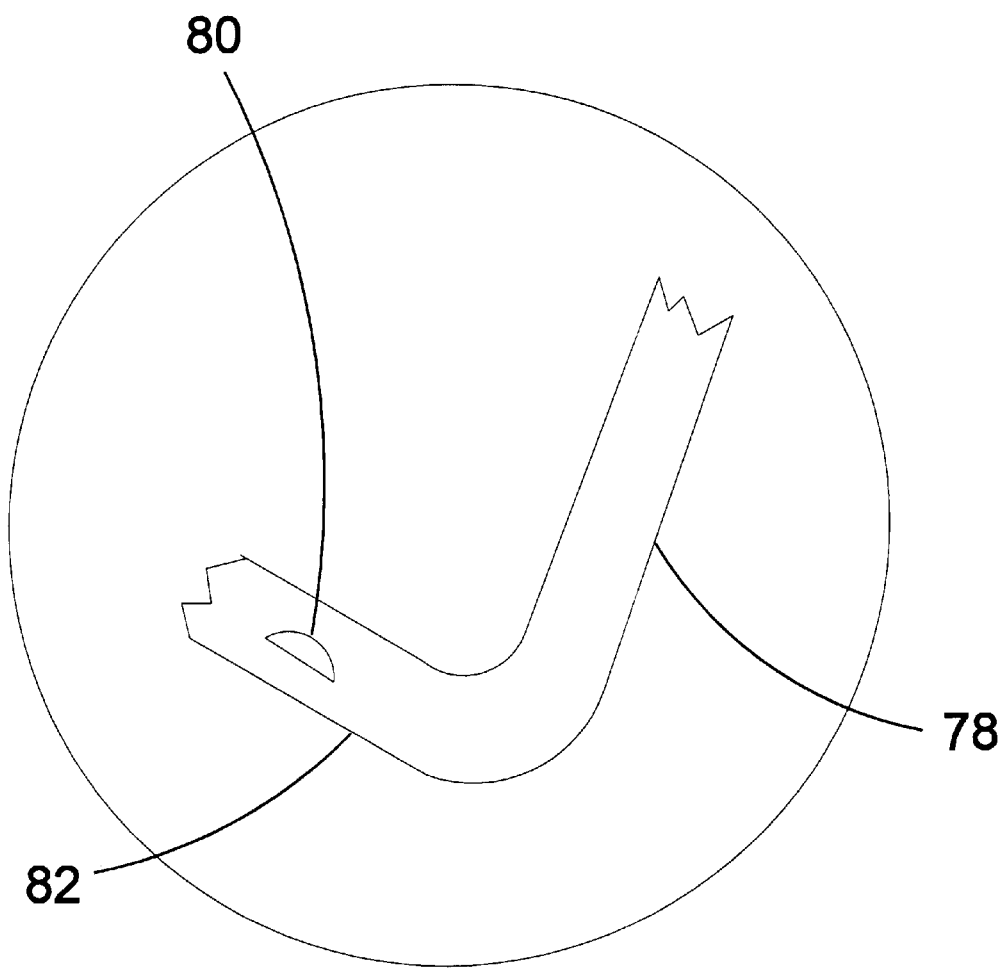
FIG. 19 is an oblique view of a portion of the control arm and the control arm shaft wing.
Figure 20:
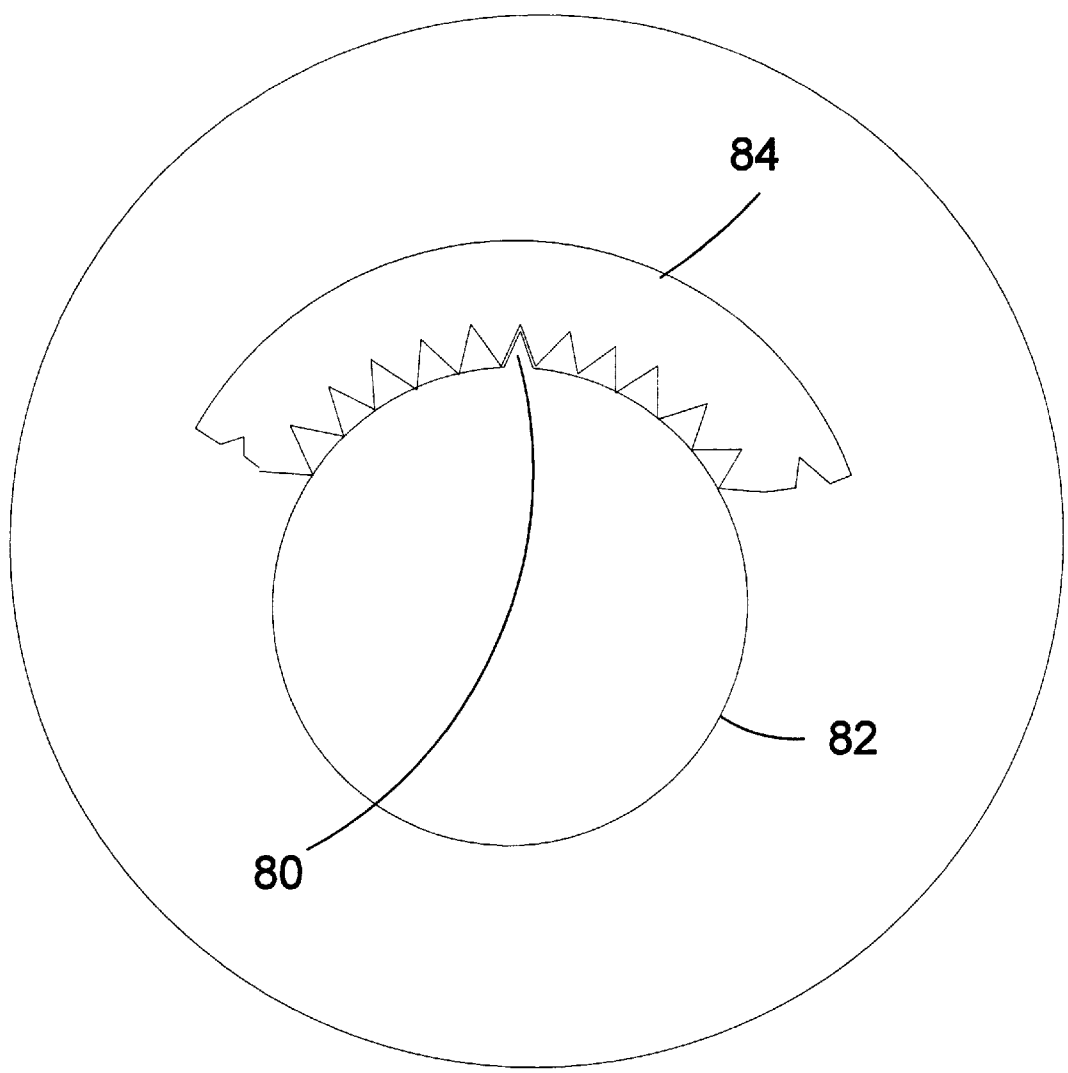
FIG. 20 is a cutaway view of a portion of the control arm and the stop gear, illustrating the control arm shaft wing within the internal threads of the stop gear.

Such resistance can also be accomplished by a mechanical stop, which locks the control arm 78 when into its intended position. In one embodiment, as shown in FIGS. 19–20, the stop is at least one wing 80 rising from the shaft 82 of the control arm 78. The control arm 78 can be pulled from a first to a second position, as shown in FIGS. 9–10,17, this movement to be distinguished from the above-described rotation of the control arm 78. In this second position, the control arm shaft 82 extrudes farther from the tower 14, although the spur gear 76 remains in engagement with the pinion gear 72 in either position. When the control arm shaft 82 is so pulled, it is pulled through, and the control arm shaft wing 80 is pulled into engagement with, a stop gear 84, which has internal teeth and is affixed to the tower 14. The internal teeth on the stop gear 84 are sized to closely receive the control arm shaft wing 80. When the control arm 78 is returned to the first position, the control arm shaft 82 is pushed back into the tower 14, and the control arm shaft wing 80 disengages from the stop gear 84. In an additional embodiment, the control arm shaft wing 80 can be replaced with a full set of gear teeth (not shown) to correspond with the internal teeth of stop gear 84. In yet another embodiment, the control arm 78 is replaced by a knob 86 sized for grasping by hand. The knob 86 is directly attached to the foregoing control arm shaft 82, which allows a substantially straight pull on the control arm shaft 82, for purposes of pulling the control arm shaft wing 80 into engagement with the stop gear 84.

In an alternative embodiment (not shown) the control arm shaft 82 includes a worm gear which rotates a spur gear having a shaft. The spur gear shaft includes a worm gear and is aligned with the pinion gear 72, or a parallel gear affixed to the pinion gear 72, such that rotation of the spur gear shaft rotates the pinion gear 72. The presence of a worm gear in the control arm 78 to pinion gear 72 gear combination, further resists movement of the pinion gear 72 by the rack gear 74.

In an alternative embodiment (not shown) the control arm shaft 82 attaches directly to the pinion gear 72, and the spur gear 76 is omitted.

In an additional embodiment, shown in FIGS. 1–6,13–14, the spur gear 76 is rotated by an electric motor 90. A foot control 92 is provided to control the electric motor 90, allowing the extension member 16 to be raised and lowered without the use of the operator's hands.

Figure 15:
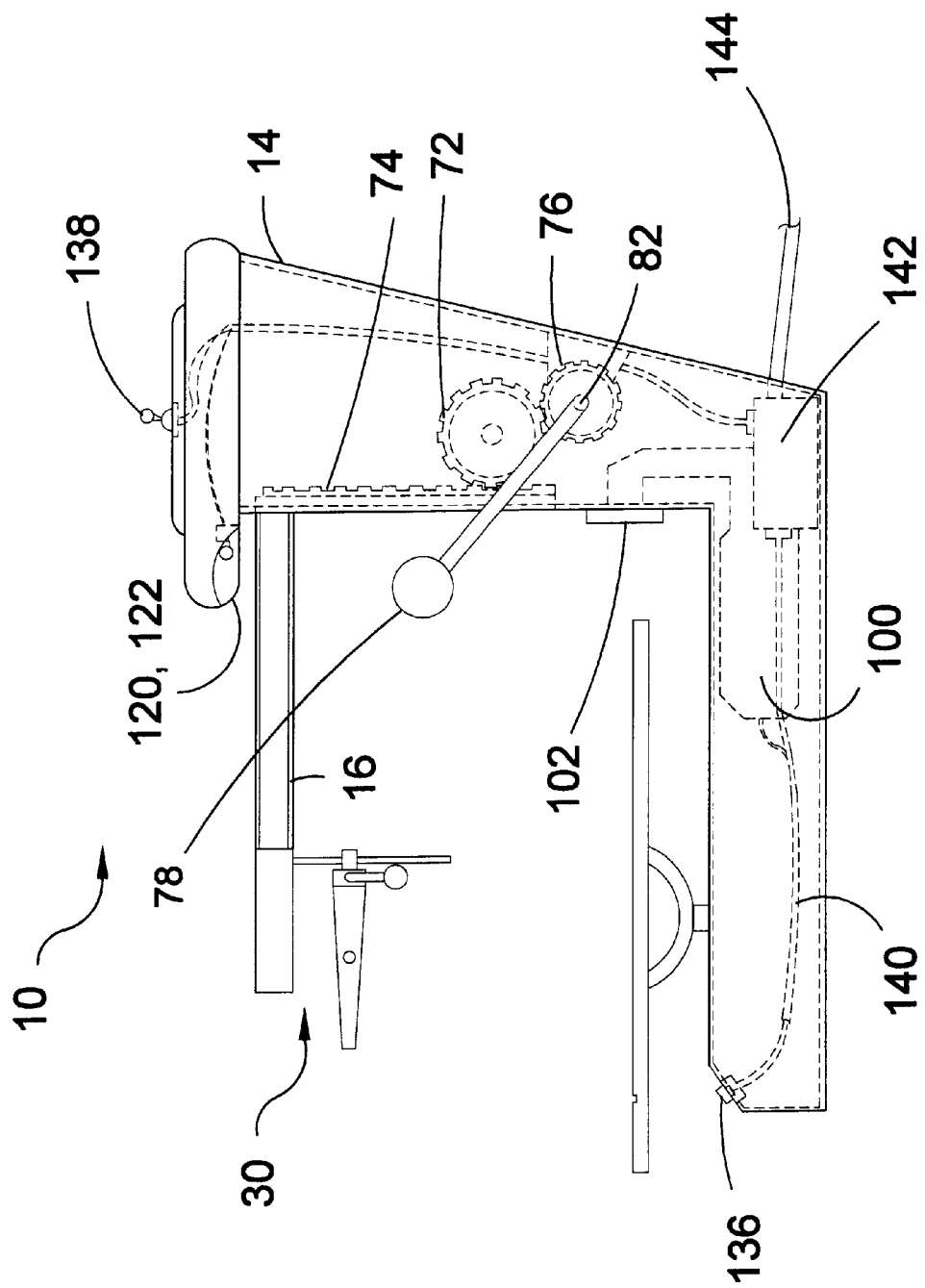
FIG. 15 is a cutaway right side view of the woodworking station of the present invention, illustrating some of the internal components for the embodiment shown, with the universal mount in a raised position.
Figure 16:
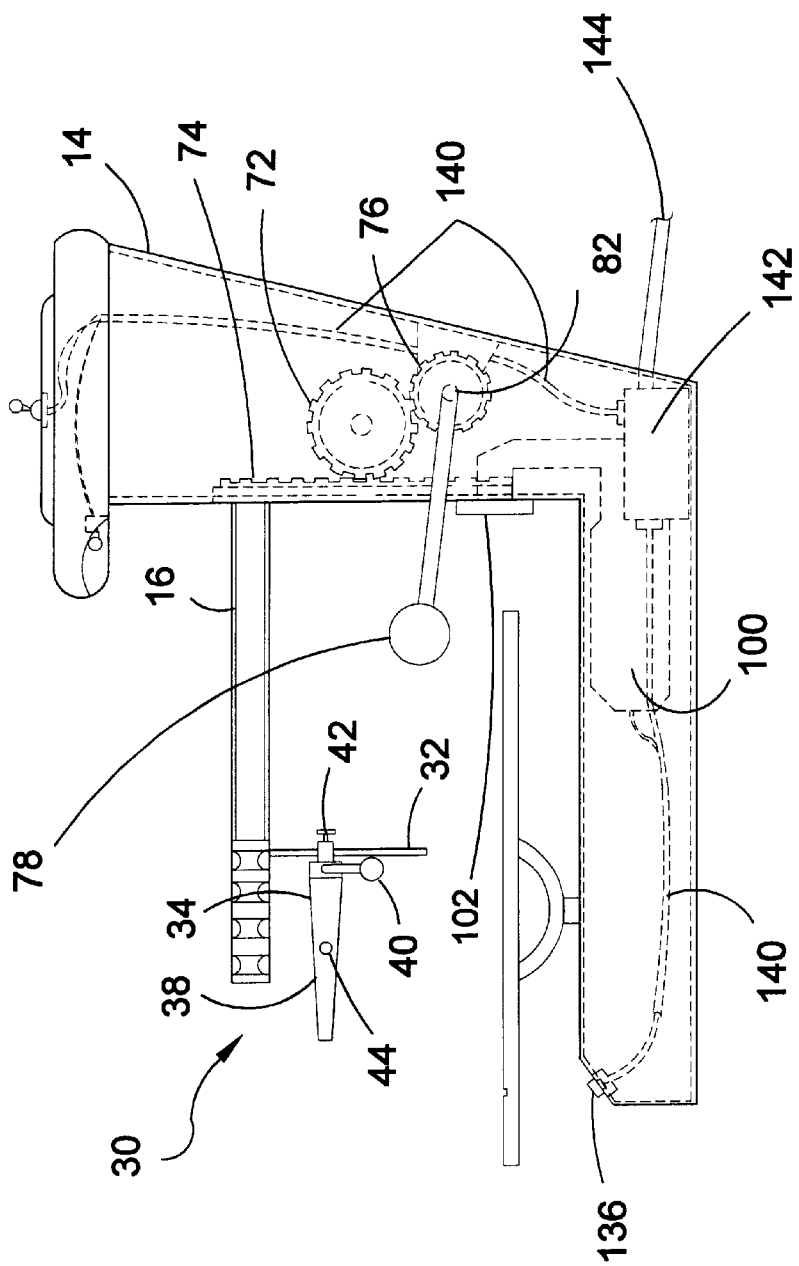
FIG. 16 is a cutaway right side view of the woodworking station of the present invention, illustrating some of the internal components for the embodiment shown, with the universal mount in a lowered position.

A blower motor 100 is provided as shown in FIGS. 15–16. The blower motor 100 is contained within the base 12, and has a blower discharge 102 positioned on the tower 14, for blowing sawdust 104 off the cutting table 60. In other embodiments (not shown) the blower motor 100 may be positioned within the tower 14, the base 12, or the extension member 16. In other embodiments a blower motor 110 is attached to the extension arm 16 and has an air discharge hose 112, as shown in FIGS. 1–4,13–14,17. FIGS. 1–5, 13–14,17 depict embodiments where the hose 112 is clamped to the permanently affixed cutting head 18, or the universal mount 30, and is proximate the permanently affixed cutting head 18 or the router 20, the hose 112 being shaped such that it discharges air in the immediate vicinity of the table hole 61. The hose 112 can be unclamped and directed to other portions of the cutting table 60. Embodiments are also provided (not shown) in which blower air is selectably discharged from either the tower 14 or a hose.

Figure 2:
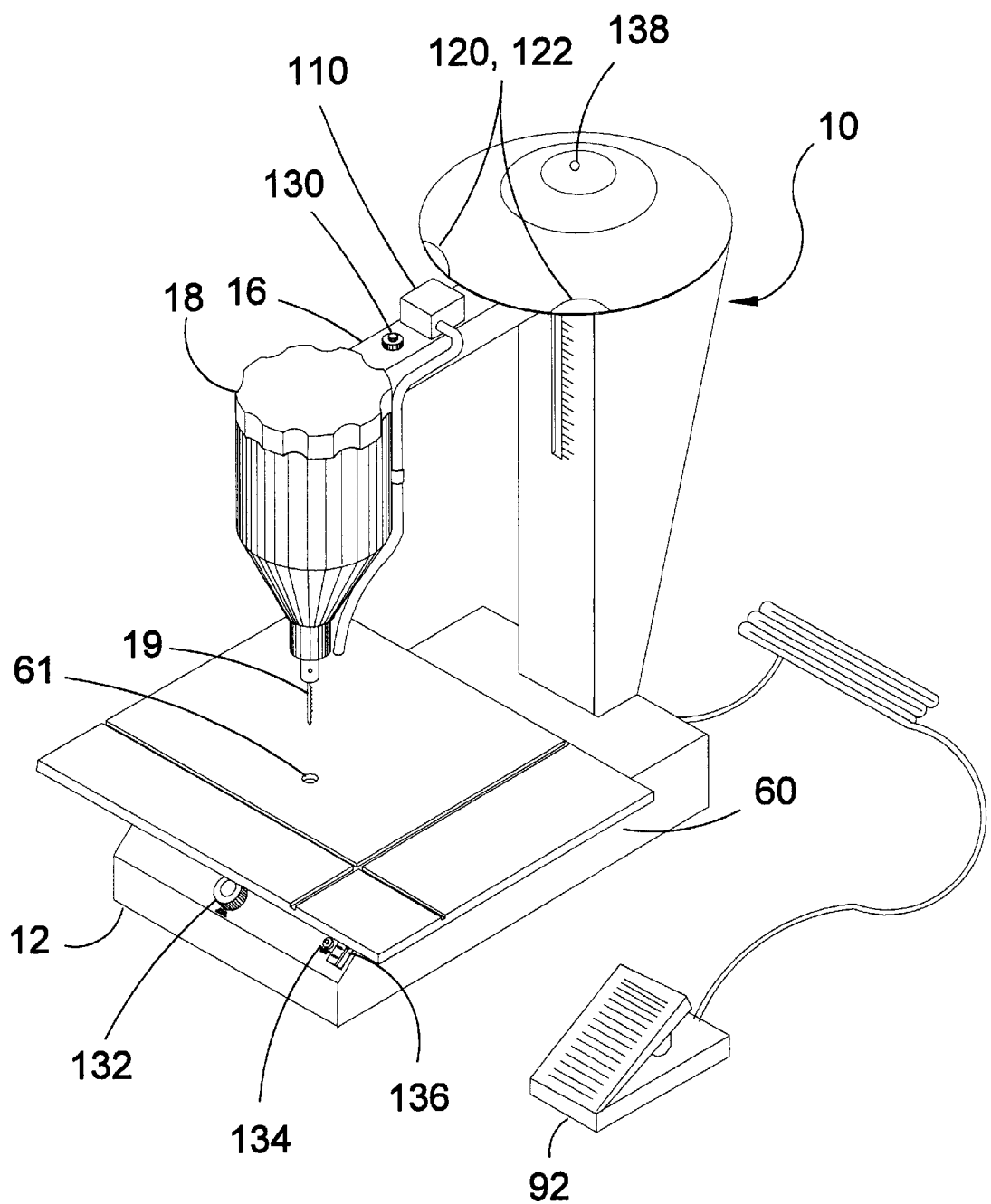
FIG. 2 is an oblique right side view of the woodworking station of the present invention, emphasizing the permanently affixed cutting head and operator controls.
Figure 3:
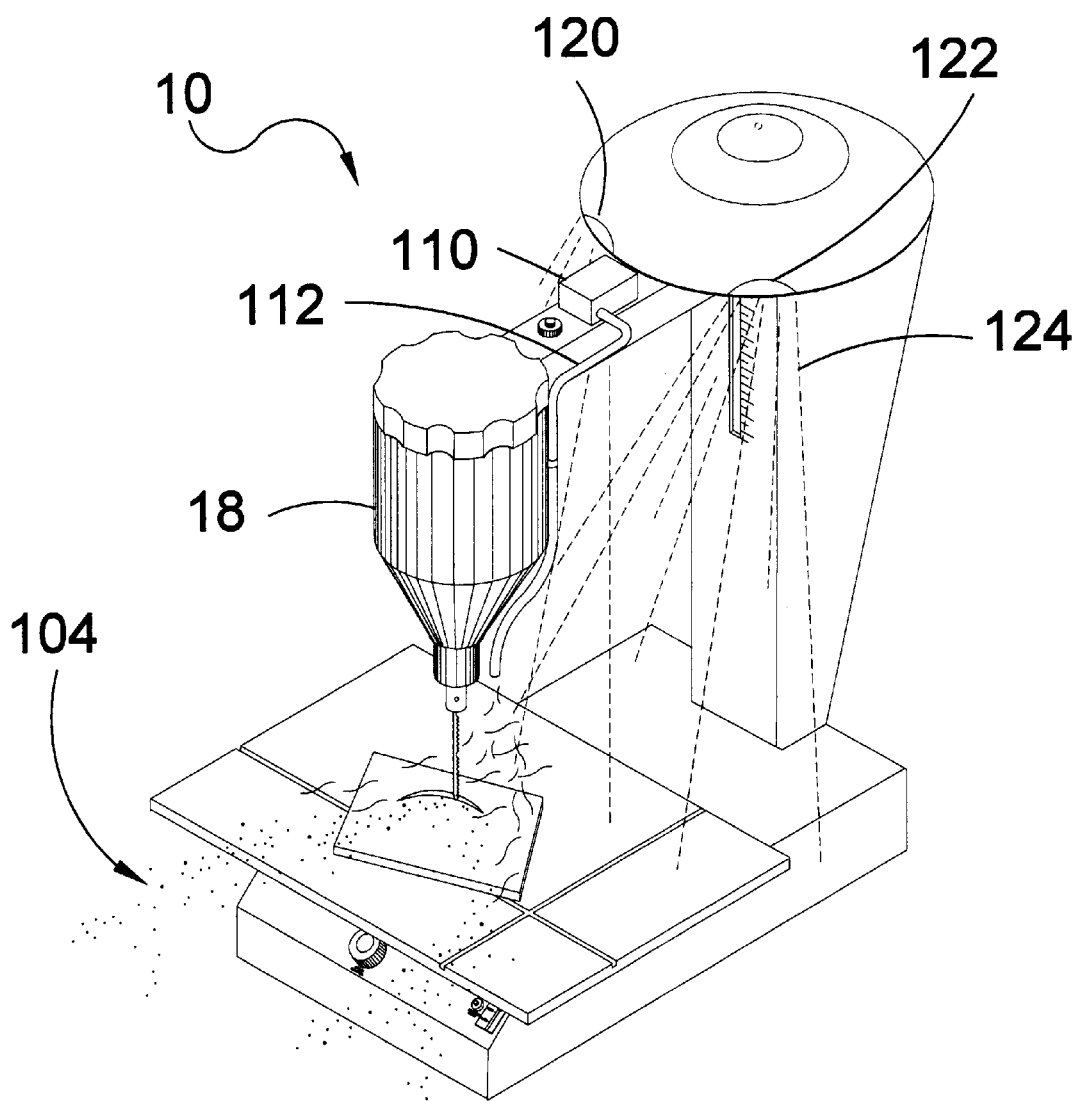
FIG. 3 is an oblique right side view of the woodworking station of the present invention, illustrating the lighting pattern.
Figure 4:
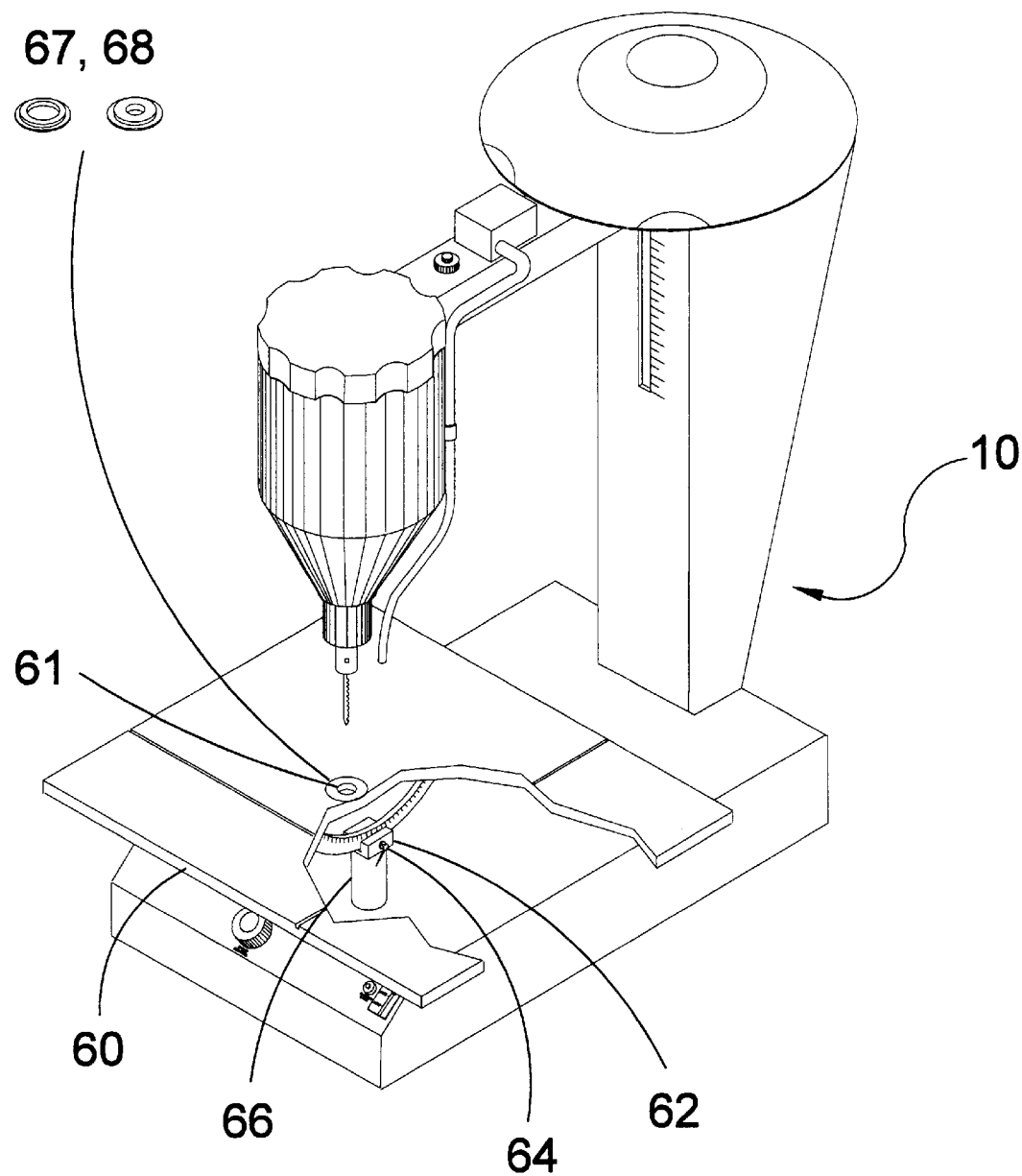
FIG. 4 is an oblique right side view of the woodworking station of the present invention, with a cutaway of the cutting table, emphasizing the cutting table and its tilt and rotation mechanisms, and interchangeable inserts.
Figure 5:
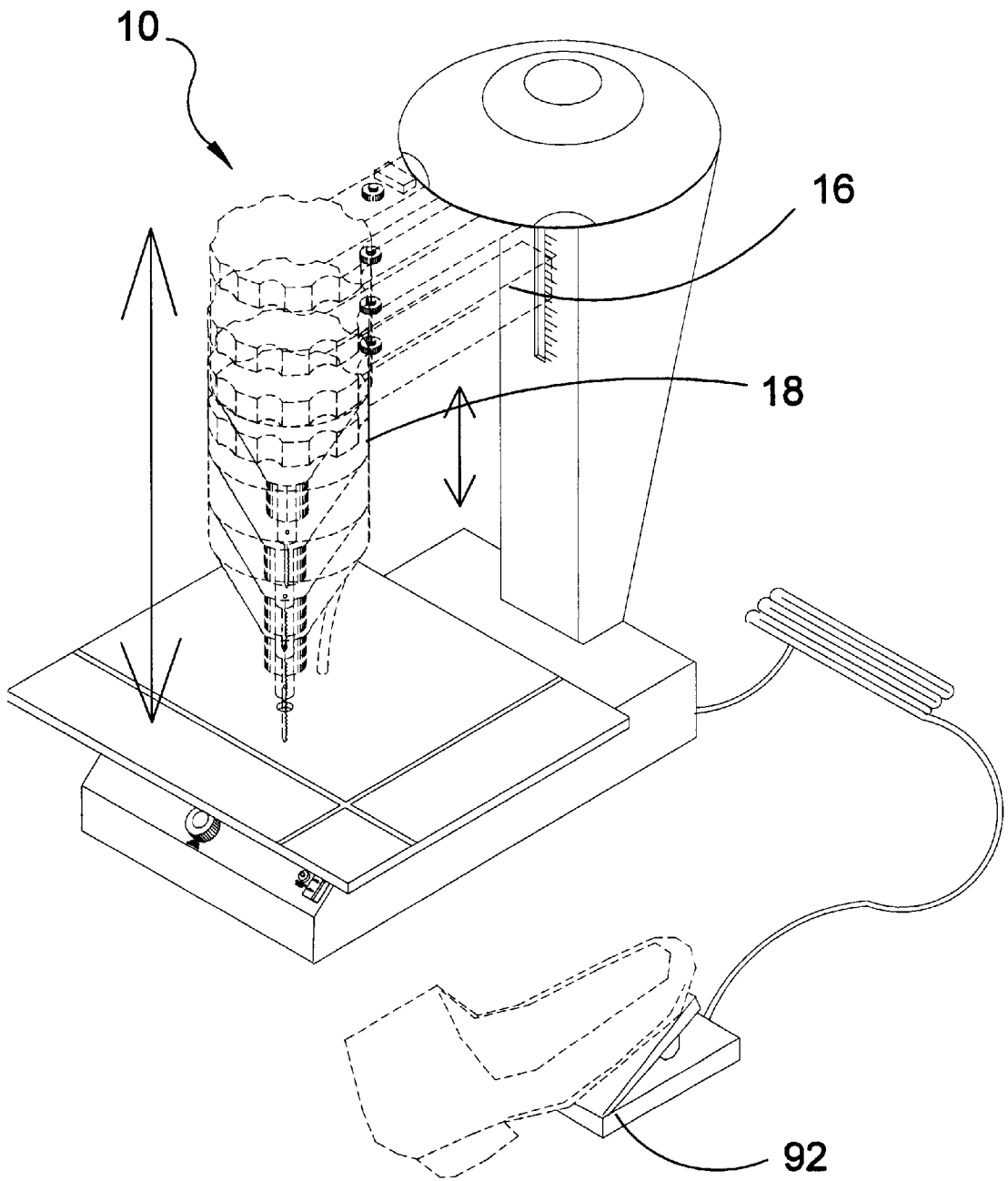
FIG. 5 is an oblique right side view of the woodworking station of the present invention, emphasizing the vertical adjustability of the cutting head.

FIGS. 2–3, 10, 12–15 reference and illustrate the lights 120,122 which are positioned within the tower 14. FIG. 3, in particular, shows the directional character of the light beams 124 when the lights 120,122 are so positioned. This positioning minimizes the light in the eyes of the operator and maximizes the coverage of the cutting table 60. In an additional embodiment (not shown), one or more lights can be positioned lower on the tower 14, which minimizes the shadow of the cutting head on the workpiece. Such lights can be in place of, or in addition to, lights 120,122.

Conveniently placed controls are provided for the applicable features of all embodiments. For example, FIG. 2 illustrates the positions of a power switch 130, and a speed control 132, for the permanently affixed cutting head 18. Similarly, a blower power switch 134, a blower speed control 136, and a light switch 138 are also provided. Representative wiring and wiring harnesses 140 for the controls and the related electrical devices, along with an available location for the electric junction box 142, and power chord 144, are shown in FIGS. 12–16.

It is anticipated that cast iron will be utilized for the most part in the construction of the primary structural components of the device 10, although steel and other high strength materials may be substituted. The various gears 72,74,76,84 can be made from annealed carbon steel, bar stock, forgings, castings, or alloy steel.

It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A woodworking station for positioning and operating a cutting head of the type having a cutting bit, comprising:
 (a) a base;
 (b) a tower extending from the base;

(c) an extension member extending from the tower;

(d) a support member extending in a downwardly direction from the extension member;

(e) means for grasping the cutting head, the grasping means being adjustably attached to the support member;

(f) a table positioned upon the base, the table having a hole for allowing passage of the cutting bit;

(g) means for vertically adjusting the extension member with respect to the tower; and (h) said grasping means comprising an expandable grasping member, said grasping member comprising opposing setscrews, the opposing setscrews being threadably positioned on the grasping member.

2. The woodworking station of claim 1, wherein the means for vertically adjusting the extension member comprises an electric motor in geared communication with the extension member such that the extension member is moved vertically along the tower when the motor is powered.

3. The woodworking station of claim 2, wherein means for vertically adjusting the extension member further comprises a foot-operated electric motor control in electronic communication with the electric motor.

4. The woodworking station of claim 1, wherein the means for vertically adjusting the extension member comprises a rotation member extending from the tower, the rotation member being in geared communication with the extension member such that the extension member is moved vertically along the tower when the rotation member is manipulated.

5. The woodworking station of claim 1, further comprising means for securing the position of the extension member following a vertical adjustment of the extension member.

6. The woodworking station of claim 1, wherein the opposing setscrews further comprise braces attached to the end of each setscrew.

7. The woodworking station of claim 1, wherein the grasping means further comprises a plurality of expandable grasping members.

8. The woodworking station of claim 1, wherein the grasping member is adjustable along the support member such that the cutting head may be positioned to abut the extension member.

9. The woodworking station of claim 1, wherein the extension member further comprises a recess, the recess facing downwardly, the recess being adapted to receive the cutting head.

10. The woodworking station of claim 1, wherein the extension member has a hole, the hole being adapted to allow passage of the power chord of the cutting head.

11. The woodworking station of claim 1, wherein the table tilts with respect to the base.

12. The woodworking station of claim 1, wherein the table rotates in a plane, the plane of rotation being substantially parallel to the base.

13. The woodworking station of claim 1, further comprising means for blowing air onto the table.

14. The woodworking station of claim 13, wherein the air is discharged from the tower.

15. The woodworking station of claim 13, wherein the means for blowing air comprises a hose, the hose having an end through which blower air is discharged.

16. The woodworking station of claim 15, wherein the hose is fixed to a universal mount and configured such that the hose end discharges air proximate the table hole.

17. The woodworking station of claim 15, wherein the hose is removably retained, such that the hose may be released from retention and the hose end positioned to discharge air onto the table.

18. The woodworking station of claim 1, further comprising the tower, the tower having at least one light for lighting at least that portion of the table proximate the table hole.

19. The woodworking station of claim 18, further comprising the at least one light, the at least one light being directional such that substantially all of the emitted light is directed toward the table.

20. The woodworking station of claim 1, further comprising at least one insert, the at least one insert being closely received and supported by the table hole, the at least one insert having a hole.

* * * * *